United States Patent
Reiner

[11] Patent Number: 5,618,084
[45] Date of Patent: Apr. 8, 1997

[54] MOTOR VEHICLE RETARDER BRAKE CONTROL METHOD

[75] Inventor: Michael Reiner, Fellbach, Germany

[73] Assignee: Mercedes-Benz AG, Germany

[21] Appl. No.: 570,162

[22] Filed: Dec. 11, 1995

[30] Foreign Application Priority Data

Dec. 9, 1994 [DE] Germany .................. 44 43 814.1

[51] Int. Cl.⁶ ..................... B60T 11/00; B60T 8/32
[52] U.S. Cl. ................................ 303/3; 303/125
[58] Field of Search .................... 303/3, 2, 125, 303/141, 146, 147, 169, 198, 191, 199, 140, 152, 142, 112; 188/290, 181 C, 271, 273, 181 T; 364/426.01, 426.02, 424.1; 180/197; 185/273

[56] References Cited

U.S. PATENT DOCUMENTS

| | | | |
|---|---|---|---|
| 3,882,973 | 5/1975 | Hakes | 303/125 |
| 3,931,870 | 1/1976 | Memmer | 303/125 |
| 5,086,865 | 2/1992 | Tanaka et al. | 188/273 |
| 5,141,086 | 8/1992 | Kaneda | 303/2 |
| 5,400,251 | 3/1995 | Ishiguro et al. | 303/3 |
| 5,472,264 | 12/1995 | Kleih et al. | 303/3 |

FOREIGN PATENT DOCUMENTS

| | | |
|---|---|---|
| 0241872 | 10/1987 | European Pat. Off. . |
| 0364682 | 4/1990 | European Pat. Off. . |
| 0467112B1 | 1/1992 | European Pat. Off. . |
| 2322446 | 12/1973 | Germany . |
| 2931491C2 | 2/1981 | Germany . |
| 266771A5 | 4/1986 | Germany . |
| 3829951A1 | 3/1990 | Germany . |
| 4010551A1 | 10/1990 | Germany . |
| 4113376 | 10/1991 | Germany . |
| 4022671A1 | 1/1992 | Germany . |
| 4124496A1 | 1/1993 | Germany . |
| 4225080A1 | 2/1993 | Germany . |

*Primary Examiner*—Douglas C. Butler
*Attorney, Agent, or Firm*—Evenson, McKeown, Edwards & Lenahan, P.L.L.C.

[57] ABSTRACT

A method sets the braking effect of the retarder brake as a function of the absolute value of the difference between wheel speed values which are derived from wheel speeds at wheels which can be influenced by the retarder brake and from wheel speeds at wheels which cannot be influenced by the retarder brake. The braking effect is reduced if the absolute value of the difference exceeds a prescribed limit value which is lower than the absolute value of the difference when one of the wheels starts to tend to lock. The effect of the retarder brake can thus already be reduced significantly before the locking point is reached so that the risk of wheels locking which otherwise exists owing to the comparatively slow decrease in braking torque of retarder brakes and thus the associated swerving of the axle of the retarder brake are reliably avoided.

6 Claims, 1 Drawing Sheet

MOTOR VEHICLE RETARDER BRAKE CONTROL METHOD

BACKGROUND AND SUMMARY OF THE INVENTION

The present invention relates to a method for controlling a retarder brake of a motor vehicle.

Retarder brakes are customarily used as engine brakes and/or primarily in utility vehicles. As a general rule, the retarder brake acts only on one axle, namely the driven one. Principally in specific vehicles for which retarder brakes with high braking effects are required, a need exists for a high degree of adhesion at the wheels of the constantly braked axle. When the road conditions are bad or the vehicle is only partially loaded, a tendency to lock can therefore occur at the constantly braked axle.

For vehicles which have an anti-lock brake system (ABS) with associated wheel speed sensor system, when there is a commonly activated service brake and retarder brake it is known to switch off the retarder brake when there is a threat of a wheel locking and with the activation of the ABS. Such a brake system is described in Published Examined Application DT 23 22 446 B2. The retarder brake is reactivated after such switching off when a braking pressure measured at a specific point in the brake fluid circuit drops below a prescribed threshold value.

In DE 29 31 491 C2 a retarder brake is described in which the anti-lock actuation signals of an ABS which indicate that a wheel is tending to lock are used to reduce the effect of an activated retarder brake even when the service brake is inactive. A control memory is activated instead of the anti-lock actuation signals and has the function in the ABS control unit of activating specific logical criteria. When actuation signals are first received in the ABS control unit, the control memory is set and then switches a control unit of the retarder brake for the purpose of allowing different characteristics of the service brake and retarder brake.

In a brake system described in DE 41 24 496 A1 having ABS and traction control (TCS), an electro-regenerative system which acts as a retarder brake is switched off for the duration of ABS control phases.

In DE 42 25 080 A1, a brake system contains a combination of a hydraulic and an electro-regenerative brake system which can be commonly actuated by an ABS configured to prevent locking of the rear axle in the case of panic braking and to control the braking effect of the rear axle in the case of normal braking, specifically as a function of the desired deceleration, the load and the present grip. In principle, it is predominantly the electro-regenerative brake circuit which is used for recovering energy in this brake system, and the hydraulic brake circuit is only activated in specific travel situations as an additional contribution to braking.

In DD 266 771 A5, a method for non-locking actuation of a hydrodynamic deceleration brake is provided in addition to the service brake. The angular speed of the driven wheels is continuously identified and evaluated. If excessive slip occurs at the driven wheels, the braking torque of the hydrodynamic deceleration brake is reduced until the risk of locking has receded.

In DE 38 29 951 A1, a method for load-dependent braking pressure control automatically distributes braking pressure to the axles of the vehicle as a function of inter-axle wheel speed signals in a wheel slip range below a point where a wheel starts to tend to lock and thus before an ABS control is activated. In this method, the distribution of braking pressure is left unchanged in each case as long as the absolute value of the difference between the inter-axle wheel speed values has not exceeded a prescribed limit value while, after such a limit value has been exceeded, the distribution of braking pressure is adjusted in a manner which reduces this excess. Thus, control of the distribution of braking force is achieved even far below the locking limit, i.e. in a range in which a customary ABS is not yet effective, e.g. in the range of inter-axle deviations in wheel speed between 1% and 7%.

In DE 40 10 551 A1, a method for improving the braking behavior of a motor vehicle prevents a locking state at a driving wheel which rolls with a low coefficient of adhesion with the activation of a braking device which is configured as a retarder and is connected upstream, as viewed in the drive direction, of a differential gear unit of a driven wheel axle.

For this purpose, the difference between the wheel speeds of the left-hand and right-hand wheel of this vehicle axle which is influenced by the braking device is identified and compared with a prescribed threshold value. If the absolute value of the difference in wheel speeds lies above the threshold value, the compensation movement of the differential is reduced or blocked. Measures against the continuously braked axle being overbraked on both sides are not provided here.

An object of the present invention is to provide a vehicle retarder brake control method by means of which locking states of the vehicle wheels caused by the effect of the retarder brake are reliably avoided.

This problem has been solved in accordance with the present invention by means of a method in which a braking effect of the retarder brake as a function of an absolute value of a difference between a wheel speed value derived from wheel speeds of at least one wheel influenceable by the retarder brake and a wheel speed value derived from wheel speeds of at least one wheel independent from influence of the retarder brake, and reducing the braking effect when the absolute value of the difference between the wheel speeds exceeds a prescribed limit value which is lower than the absolute value of the difference between the wheel speeds when one of the wheels has a tendency toward locking.

In this new method, the braking force of the activated retarder brake is already reduced before one of the wheels which can be acted on by the retarder brake starts to tend to lock in that this reduction already takes place when the absolute value of the difference between inter-axle wheel speed values exceeds a prescribed limit value which is smaller than the absolute value of the difference between the inter-axle wheel speeds when one of the wheels starts to tend to lock. As a result of this earliest practical reduction in the braking effect of the retarder brake, there is, in contrast with conventional systems in which the retarder brake is only switched off with an ABS signal which indicates the tendency to lock, no risk of excessively late switching off of the retarder brake owing to the comparatively slow reduction in braking torque of the retarder brake.

An advantage of the present invention is that it prevents locking of wheels owing to the braking effect of the retarder brake. Swerving of the continuously braked axle, with the associated risk of skidding, is reliably counteracted by this novel method both with single vehicles and also with lorries and semitrailers.

By virtue of the information on the difference between wheel speeds being used, the present invention makes it unnecessary to sense braking forces or absolute values of the coefficient of adhesion or of the wheel slip.

By specifying a speed-dependent limit value for the absolute value of the difference between wheel speeds, a higher degree of utilization of the adhesion for the effect of the retarder brake is made possible at lower vehicle speeds. Analogously, optimum adaptation of the starting time for the reduction of the effect of the activated retarder brake as a function of the desired braking for the service brake is now achievable. A monotonously decreasing dependence is understood here to be a profile which is constant or decreases in certain areas.

As a result of the dependence of the degree of reduction in the constant braking effect on the gradient of the absolute value of the difference between wheel speeds which increases over time, the reduction can be favorably adapted to the respective profile of a braking process and the retarder brake can be reset comparatively quickly to a suitable value.

According to another aspect of the present invention, a cyclical execution of the method may be advantageously provided in which the absolute value of the difference between inter-axle wheel speeds is monitored in each cycle and the braking effect of the retarder brake is decreased incrementally in each cycle as long as the absolute value of the difference between the inter-axle wheel speeds is greater than the respective limit value.

In a further development of the present invention, after a preceding reduction in the constant braking effect during a braking process, the constant braking effect is raised again if the absolute value of the difference between the inter-axle wheel speeds drops below the limit value by a prescribable value. As a result, a constant braking component which is the maximum possible for each loading state and road state is effectively maintained.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
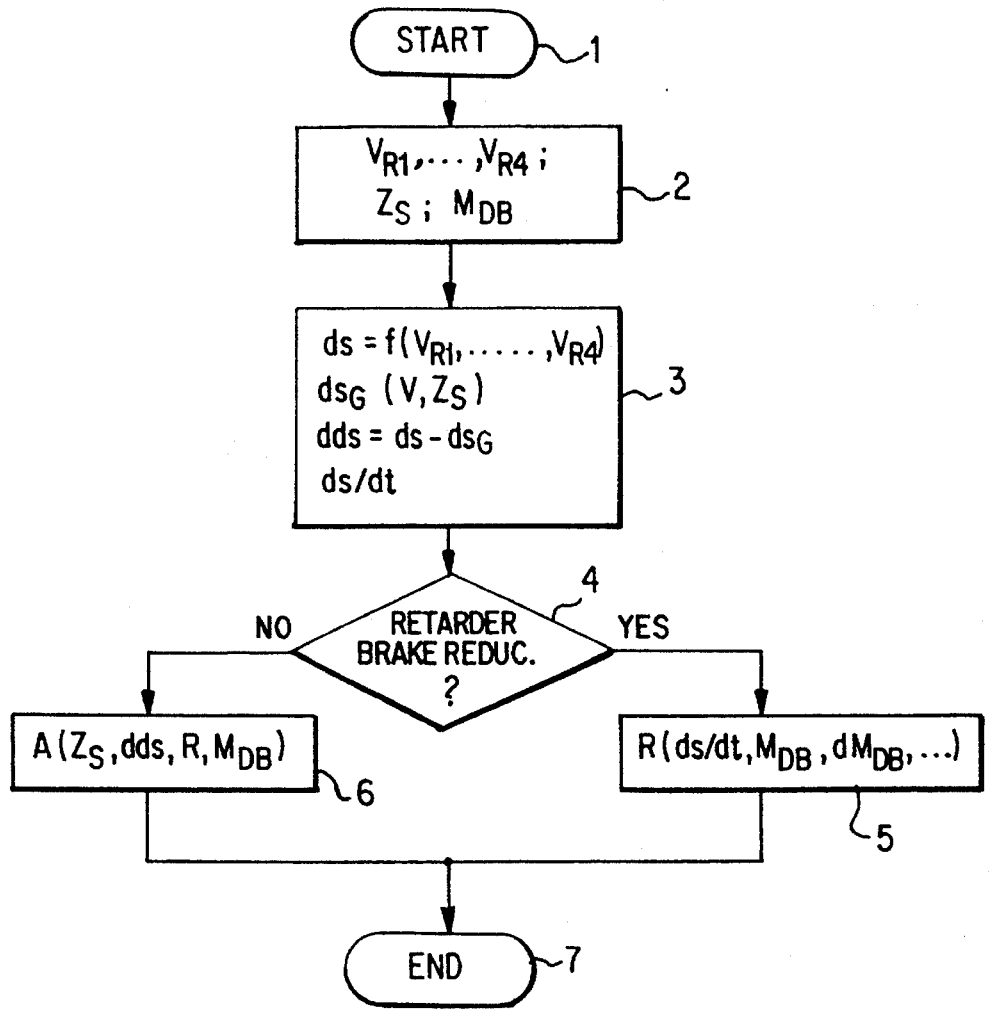
FIG. 1 is a program sequence chart of a method for controlling a retarder brake in accordance with the present invention.

The program sequence chart of FIG. 1 shows that part of the method sequence for controlling a retarder brake, for example an engine brake or a retarder of a utility vehicle, which relates to the avoidance of the locking of a wheel owing to an excessively high constant braking effect. Further control programs for the retarder brake are conventional and therefore do not require any further explanation and/or illustration. The method according to FIG. 1 is implemented in the control of the brakes of the motor vehicle in a manner familiar to the person skilled in the art and is carried out by that person in cycles according to FIG. 1. Typical cycle times lie between approximately 10 ms to 30 ms. It will be assumed in this example, without restricting the general inventive principles, that the retarder brake acts on the wheels of a driven rear axle while the wheels of a front axle of the motor vehicle are not subject to the effect of the retarder brake.

After the starting step 1, the relevant cycle begins in step 2 with the determination of the necessary input variables. These variables include the braking effect ($M_{DB}$) of the retarder brake desired and requested directly by the driver or calculated by the system, the braking effect ($z_s$) of the service brake requested by the driver and the wheel speeds or, which amounts to the same, the so-called wheel speeds ($V_{R1}$ to $V_{R4}$) of the wheels of the constantly braked axle and of the wheels of the axle which is not influenced by the retarder brake.

In step 3, the values of the variables which are decisive for a possible reduction in the constant braking effect are determined, specifically the instantaneous absolute value (ds) of the difference between a wheel speed value which is associated with the constantly braked rear axle and a wheel speed value associated with the front axle which is not constantly braked, the time gradient (ds/dt) of this absolute value (ds) of the difference between wheel speeds and the value of a limit value ($ds_G$) which results for the instantaneous travel situation. A reduction in the constant braking effect is performed when the limit value ($ds_G$) is exceeded by the absolute value (ds) of the difference between the wheel speeds.

The absolute value (ds) of the difference between the wheel speeds is calculated here by a prescribed function (ds=f($v_{r1}$, . . . , $V_{R4}$)) as described in the above-mentioned DE 38 29 951 C2. In particular, the measured wheel speeds ($V_{R1}$ to $V_{R4}$) measured are filtered and conditioned in a suitable way. It is possible for this conditioning to contain an adjustment of the wheel speeds in order to average out wheel speed differences which are not due to wheel slip but instead arise, for example, from cornering, different wheel diameters and the like.

Using these conditioned or adjusted wheel speeds, the absolute value (ds) of the difference between the wheel speeds required here can be formed as, for example, an absolute value of the difference between the average value of the wheel speeds of the rear axle and the average value of the wheel speeds of the front axle. Subsequently, except for the respective first cycle of a new operating phase, the time gradient (ds/dt) of the absolute value (ds) of the difference between the wheel speeds is identified by correspondingly forming differences with the absolute value of the preceding cycle and dividing by the cycle time.

In order to determine the instantaneously decisive limit value ($ds_G$) for the absolute value (ds) of the difference between the wheel speeds, a characteristic diagram of the limit value ($ds_G$) is prescribed in the brake control as a function of the required braking effect ($z_s$) for the service brake and of the speed (v) of the vehicle. The speed of the vehicle is preferably identified from the measured wheel speeds or alternatively determined in some other way. One possible way of realizing the characteristic limit value diagram is illustrated in FIG. 2, where the desired braking ($z_s$) of the service brakes is plotted on the abscissa as a percentage of the maximum braking effect and the limit value ($ds_G$) of the absolute value (ds) of the difference between the wheel speeds being plotted on the ordinate as a percentage of an averaged wheel speed value, e.g. the conditioned average value of the speeds of the two front axle wheels.

The continuous limit value curve ($ds_{Go}$) represents the profile of the limit value ($ds_G$) to be prescribed as a function of the desired braking ($z_s$) of the service brakes at speeds (v) of the vehicle which are greater than or equal to 50 km/h. The dashed curve ($ds_{Gu}$) shows in an analogous way the profile of the limit value ($ds_G$) to be prescribed at speeds (v) of the vehicle which are near to 0 km/h. Both curves extend above a desired braking ($z_s$) of the service brakes of greater than or equal to 30% along a horizontal line by way of which the limit value ($ds_G$) is set to the value 1%. The effect is that, in the case of greater braking requirements, the limit value ($ds_G$) remains set to the range of the absolute value (ds) of the difference between the wheel speeds required for service brakes as a measure of the inter-axle difference in wheel slip of approximately 1% to 2%. In the case of desired braking operations ($z_s$) of the service brakes below 30%, a larger degree of difference between the inter-axle wheel slip (i.e. a larger limit value ($ds_G$) for the absolute value (ds) of the difference between the wheel speeds), is accepted as illustrated in FIG. 2.

Furthermore, in the range where desired braking ($z_s$) the service brakes is absent or less, a higher degree of utilization of adhesion is permitted for lower vehicle speeds (v) by virtue of the retarder brake without adversely affecting safety. Correspondingly, in FIG. 2, a constant, horizontal limit value profile is provided, between desired braking values ($z_s$) with the service brakes between 0% and 15%, as a function of the desired braking ($z_s$) of the service brakes, the limit value ($ds_G$) at speeds (v) of the vehicle near to 0 km/h being set to 10% and at speeds (v) of the vehicle which are greater than or equal to 50 km/h being set to 5%.

Figure 2:
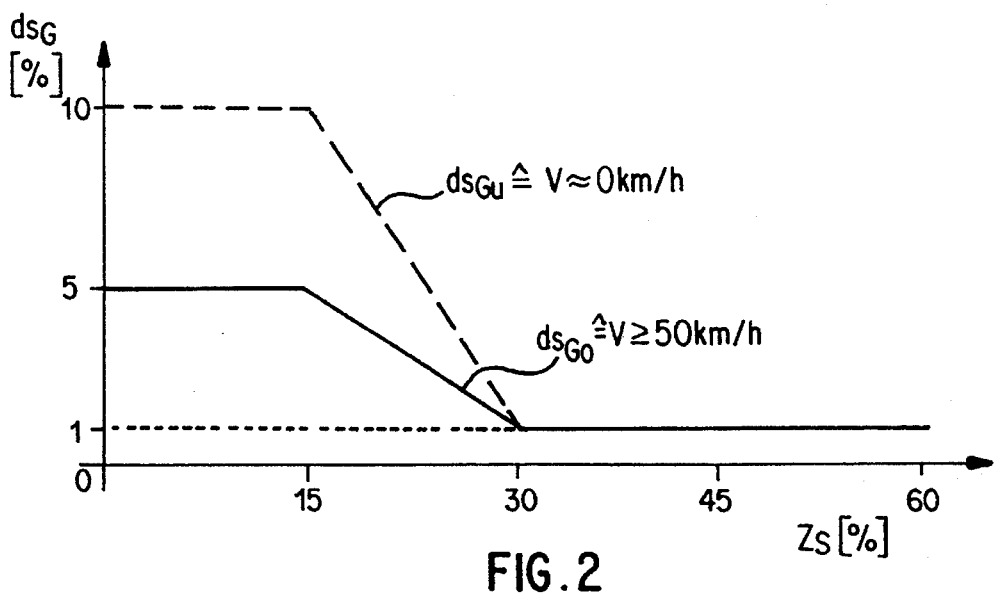
FIG. 2 shows a graphic of characteristic curves of the limit value, decisive for reducing the constant braking effect, for the value of an absolute value of the difference between inter-axle wheel speeds as a function of the desired braking for the service brake and of the vehicle speed.

For intermediate speed values (v) of the vehicle, the characteristic diagram of FIG. 2 contains interpolated values for the limit value ($ds_G$). In the range of values for the desired braking ($z_s$) of the service brakes between 15% and 30%, the characteristic diagram in FIG. 2 interpolates linearly for the limit value ($ds_G$) as a function of the desired braking ($z_s$) of the service brakes. Of course, modified characteristic diagrams for the limit value ($ds_G$) can be prescribed according to requirements, the characteristic diagrams having a monotonously decreasing dependence on the desired braking ($z_s$) of the service brakes, i.e. a profile which remains constant or decreases as the desired braking ($z_s$) increases, and likewise a monotonously decreasing profile as a function of the speed (v) of the vehicle, i.e. a constant or decreasing limit value ($ds_G$) as the speed increases.

As a final measure of step 3, the difference ($dds=ds-ds_G$) between the instantaneous absolute value (ds) of the difference between the wheel speeds and the limit value ($ds_G$) which is instantaneously valid therefor is formed. In a subsequent interrogation step 4 it is now tested whether the setting of the retarder brake is to be reduced. A primary criterion for this is the limit value ($ds_G$) being exceeded by the absolute value (ds) of the difference between the wheel speeds, i.e. a positive value of the difference (dds) determined in previous step 3 between the absolute value (ds) of the difference between the wheel speeds and the limit value ($ds_G$). As a supplement there may be provision to select this difference (dds), which indicates the amount of the deviation of the absolute value (ds) of the difference between the wheel speeds from the limit value ($ds_G$), to be variable in a respective method cycle as a triggering factor for a further decrease of the retarder brake, specifically as a function of the first reduction, or a repeated reduction, of the constant braking effect, taking into account the waiting time which is expedient for the comparatively slow decrease in braking torque in the retarder brake.

If the result of the interrogation in step 4 is that the braking effect of the retarder brake is to be reduced, in a subsequent step 5 the magnitude of the decrease (R) of the retarder brake is identified, specifically as a function of the time gradient (ds/dt), previously determined in step 3, of the absolute value (ds) of the difference between the wheel speeds and/or of the set level of the constant braking effect ($M_{DB}$) requested by the driver. Depending on the application, the reduction can be continuous or take place in a stepped fashion by one or more steps simultaneously or according to reduction factors which are permanently prescribed and, if appropriate, can be experientially learned adaptively.

As a specific case there may in particular be provision for the retarder brake to be switched off entirely if it is detected during the ongoing checking of the absolute value (ds) of the difference between the wheel speeds that even after expiration of the waiting time of approximately 0.5 s to 1.5 s which is necessary for reducing the braking torque of the retarder brake, the limit value ($ds_G$) is still exceeded by an increment of for example 0.5% to 1%. The braking effect of the retarder brake is subsequently decreased by the identified reduction magnitude (R) by the brake control. Then, the end 7 of a method cycle is reached and a new cycle begins as long as the brake control is active.

If interrogation step 4 detects that the absolute value (ds) of the difference between the wheel speeds lies below the limit value ($ds_G$), that the braking effect of the retarder brake is therefore not too strong and a decrease is therefore not necessary, the method subsequently continues with a raising step 6. In step 6, the braking effect of the retarder brake is raised again by a prescribed value (A) if specific, interrogated conditions are fulfilled. The conditions which have to be fulfilled consist in the fact that a superimposition with the service brake is terminated, that the absolute value (ds) of the difference between the wheel speeds has dropped by more than a prescribable value below the instantaneously valid limit value ($ds_G$), that the magnitude of preceding decreases did not lie above a preselectable value and that a driver request for use of the retarder brake is still present. If these conditions apply, the brake control raises the braking effect of the retarder brake by the preselectable increment (A), after which the method cycle for this case is terminated and the system proceeds to the end step 7 of the cycle. If the conditions interrogated in step 6 for raising the braking effect of the retarder brake again are not fulfilled, the method proceeds directly to the end step 7 of the cycle, and the constant braking effect is not raised again in this way.

The method of operation of the retarder brake which is monitored for adhesion according to the method becomes clear from the above description of a method cycle. As soon as the retarder brake braking effect, identified by the absolute value of the difference between the wheel speeds, exceeds a magnitude prescribed in each case by the limit value for the absolute value of the difference between the wheel speeds, the effect of the retarder brake is reduced by the brake control electronics to a magnitude which is non-critical for adhesion. Here, this reduction already starts far below the wheel locking limit and thus significantly earlier than in the conventional systems in which the retarder brake is not switched off until the ABS is activated. If the desired braking with the service brake is reduced again by the driver in the course of a braking process, the method of the present invention permits previously decreased retarder brake components to be brought into play if conditions which are to be observed for this purpose are present. Thus, a constant braking effect which is as high as possible but nevertheless uncritical can always be advantageously achieved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for controlling a motor vehicle retarder brake, comprising the steps of setting a braking effect of the retarder brake as a function of an absolute value of a difference between a wheel speed value derived from wheel speeds of at least one wheel influenceable by the retarder brake and a wheel speed value derived from wheel speeds of at least one wheel independent from influence of the retarder brake, and reducing the braking effect when the absolute value of the difference between the wheel speeds of the at least one wheel exceeds a prescribed limit value which is lower than the absolute value of the difference between the wheel speeds of the at least one wheel when one wheel has a tendency toward locking.

2. The method according to claim 1, wherein the limit value is a function which decreases monotonously in dependence on vehicle speed.

3. The method according to claim 1, wherein the limit value is a function which decreases monotonously in dependence on the desired braking value for a service brake of the vehicle.

4. The method according to claim 1, wherein the reduction of the braking effect of the retarder brake has a magnitude determined as a function of a time gradient of the absolute value of the difference between the wheel speeds, whereby the magnitude of the reduction increases as the time gradient rises.

5. The method according to claim 1, further comprising the steps of cyclically monitoring the absolute value of the difference between the wheel speeds, and incrementally reducing the braking effect of the retarder brake in each cycle when the absolute value of the difference between the wheel speeds is larger than the prescribed limit value.

6. The method according to claim 1, further comprising the step of again raising the braking effect of the retarder brake during a braking process after a preceding reduction when the absolute value of the difference between the wheel speeds drops by a predetermined value below the prescribed limit value.

* * * * *